(12) United States Patent
Yoshida et al.

(10) Patent No.: US 11,603,859 B2
(45) Date of Patent: Mar. 14, 2023

(54) VARIABLE GEOMETRY TURBINE AND SUPERCHARGER

(71) Applicant: MITSUBISHI HEAVY INDUSTRIES ENGINE & TURBOCHARGER, LTD., Sagamihara (JP)

(72) Inventors: Toyotaka Yoshida, Tokyo (JP); Makoto Ozaki, Kanagawa (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 0 days.

(21) Appl. No.: 17/442,898

(22) PCT Filed: Apr. 19, 2019

(86) PCT No.: PCT/JP2019/016765
§ 371 (c)(1),
(2) Date: Sep. 24, 2021

(87) PCT Pub. No.: WO2020/213151
PCT Pub. Date: Oct. 22, 2020

(65) Prior Publication Data
US 2022/0196030 A1 Jun. 23, 2022

(51) Int. Cl.
*F04D 29/42* (2006.01)
*F04D 29/28* (2006.01)
(Continued)

(52) U.S. Cl.
CPC .......... *F04D 29/4206* (2013.01); *F02B 37/24* (2013.01); *F04D 17/10* (2013.01); *F04D 29/284* (2013.01)

(58) Field of Classification Search
CPC .... F04D 29/4206; F04D 29/284; F04D 17/10; F04D 25/04; F04D 25/045; F02B 37/24;
(Continued)

(56) References Cited

U.S. PATENT DOCUMENTS

| | | | |
|---|---|---|---|
| 8,590,305 B2 * | 11/2013 | Anschel | F02B 37/22 415/126 |
| 10,006,354 B2 * | 6/2018 | Kindl | F01D 9/026 |

(Continued)

FOREIGN PATENT DOCUMENTS

| | | | |
|---|---|---|---|
| CN | 108699959 A | * 10/2018 | .......... F01D 17/165 |
| JP | S54-20213 A | 2/1979 | |

(Continued)

OTHER PUBLICATIONS

International Search Report dated Jun. 18, 2019 in International Patent Application No. PCT/JP2019/016765 with English Translation.

(Continued)

*Primary Examiner* — Grant Moubry
(74) *Attorney, Agent, or Firm* — Birch, Stewart, Kolasch & Birch, LLP

(57) ABSTRACT

Provided are a variable geometry turbine and a supercharger including the same that can change flow rate characteristics of a turbine in accordance with engine output with simple structure and can adjust the flow angle of a fluid flowing into a turbine impeller to any angle in the circumferential direction of the turbine impeller. The variable geometry turbine (10) includes a turbine impeller (12) configured to rotate about an axis line, a turbine housing (30) configured to accommodate the turbine impeller (12) and form a throat passage (32) and a scroll flow channel (34) on the outer circumferential side of the turbine impeller (12), the scroll flow channel (34) communicating with the throat passage (32), and a width changing mechanism in which a width change portion (52) that changes a passage width of the throat passage (32) along the circumferential direction of the turbine impeller (12) is movable in the width direction of the passage width.

4 Claims, 7 Drawing Sheets

(51) Int. Cl.
*F04D 17/10* (2006.01)
*F02B 37/24* (2006.01)

(58) Field of Classification Search
CPC ........ F02B 37/20; F02B 37/225; F02B 33/32; F02B 33/40; F02C 6/12
See application file for complete search history.

(56) References Cited

U.S. PATENT DOCUMENTS

| | | |
|---|---|---|
| 2003/0190231 A1 | 10/2003 | Mulloy et al. |
| 2005/0005604 A1 | 1/2005 | Mulloy et al. |
| 2007/0122267 A1* | 5/2007 | Lombard .............. F01D 17/143 415/145 |
| 2013/0315718 A1* | 11/2013 | Parker .................... F02B 37/22 415/157 |
| 2013/0323041 A1* | 12/2013 | Kierat .................... F02B 37/22 415/204 |
| 2015/0110607 A1* | 4/2015 | Iizuka ................... F01D 17/165 415/151 |
| 2019/0323368 A1 | 10/2019 | Yoshida et al. |
| 2020/0263559 A1* | 8/2020 | Blaylock ................. F02B 37/24 |

FOREIGN PATENT DOCUMENTS

| | | |
|---|---|---|
| JP | 61-066628 U | 5/1986 |
| JP | 4-362223 A | 12/1992 |
| JP | 2003-301726 A | 10/2003 |
| JP | 2013-543951 A | 12/2013 |
| WO | WO-2014042015 A1 * | 3/2014 ........... F01D 17/165 |
| WO | WO 2018/123045 A1 | 5/2018 |

OTHER PUBLICATIONS

Written Opinion dated Jun. 18, 2019 in Interntaional Patent Application No. PCT/JP2019/016765 with English Translation.

* cited by examiner

VARIABLE GEOMETRY TURBINE AND SUPERCHARGER

TECHNICAL FIELD

The present disclosure relates to a variable geometry turbine and a supercharger.

BACKGROUND ART

A turbine of a supercharger employed, for example, for an automobile is operated according to engine output ranging widely from low output to high output. Therefore, there is a demand for improving performance in each output state.

To address such a demand, there is, for example, a variable geometry (VG) turbine that can adjust the flow rate characteristics in accordance with engine output.

As a turbine that can adjust the flow rate characteristics in accordance with engine output, PTL 1 discloses a turbine having a scroll flow channel in which a main scroll and the sub-scroll are partitioned. In the scroll flow channel, a cylindrical slide valve is used to stop the sub-scroll in accordance with a drive state of the engine.

CITATION LIST

Patent Literature

[PTL 1]
 PTL 1: Japanese Utility Model Laid-Open No. S61-66628

SUMMARY OF INVENTION

Technical Problem

On the other hand, engine performance (output) has been improved in recent years, and exhaust gas temperatures tend to be increased. In such a case, a VG turbine having a complex link mechanism has problems on a failure rate and reliability of components forming the link mechanism.

Further, in general, fluid inflow to a turbine impeller is large, and thus a flow angle tends to be larger near the start of winding (fluid inlet) of a scroll flow channel. In contrast, a flow angle tends to be small near the end of winding of a scroll flow channel, because the flow velocity of a flowing exhaust gas is reduced due to a friction loss subjected from the wall face forming the scroll flow channel. The same applies to the turbine disclosed in PTL 1 and VG turbines.

The present disclosure has been made in view of such circumstances and intends to provide a variable geometry turbine that can change flow rate characteristics of a turbine in accordance with engine output with a simple structure and that can adjust the flow angle of a fluid flowing into a turbine impeller to any angle in the circumferential direction of the turbine impeller, and to provide a supercharger having the variable geometry turbine.

Solution to Problem

To solve the above problems, the variable geometry turbine and the supercharger having the variable geometry turbine of the present disclosure employ the following measures.

Specifically, a variable geometry turbine according to one aspect of the present disclosure includes a turbine impeller configured to rotate about an axis line, a turbine housing configured to accommodate the turbine impeller and form a throat passage and a scroll flow channel on an outer circumferential side of the turbine impeller, the scroll flow channel communicating with the throat passage, and a width changing mechanism in which a width change portion that changes a passage width of the throat passage along a circumferential direction of the turbine impeller is movable in a width direction of the passage width.

The variable geometry turbine according to the aspect includes a turbine impeller configured to rotate about an axis line, a turbine housing configured to accommodate the turbine impeller and form a throat passage and a scroll flow channel on an outer circumferential side of the turbine impeller, and a width changing mechanism in which a width change portion that changes a passage width of the throat passage along a circumferential direction of the turbine impeller is movable in a width direction of the passage width.

Accordingly, a passage width of the throat passage is changed by the width changing mechanism (that is, the flow channel area of the throat passage is adjusted), and it is thus possible to adjust the flow rate of a fluid (for example, an exhaust gas discharged from an engine) flowing into the turbine impeller from the scroll flow channel. This can change the flow rate characteristics of a turbine in accordance with engine output with a simple structure without using a complex structure such as VG turbines. Thus, compared to the VG turbine, the number of components can be reduced by the simplified structure, and accordingly, the failure rate can be reduced and the reliability can be improved.

Further, the passage width of the throat passage is changed by the width change portion along the circumferential direction of the turbine impeller, and it is thus possible to adjust the flow angle of a fluid flowing into a turbine impeller to any angle in the circumferential direction of the turbine impeller.

The flow angle is larger, for example, near the start of winding (exhaust gas inlet side) of the scroll flow channel because of large fluid inflow in the turbine impeller. In contrast, the flow angle is smaller near the end of winding of the scroll flow channel, because the flow velocity is reduced due to a friction loss subjected from the inner wall face of the turbine housing. At this time, the passage width of the throat passage is changed to gradually expand from the start of winding to the end of winding of the scroll flow channel, and it is thus possible to avoid excessive fluid inflow to the turbine impeller near the start of winding and avoid a reduction in the flow velocity of the fluid near the end of winding. In other words, it is possible to avoid unevenness of flow angles in the circumferential direction of the turbine impeller to obtain an even distribution of flow angles in the circumferential direction of the turbine impeller.

Further, in the variable geometry turbine according to one aspect of the present disclosure, the width change portion continuously changes the passage width of the throat passage along a circumferential direction of the turbine.

According to the variable geometry turbine of the aspect, the width change portion can continuously change the passage width of the throat passage along a circumferential direction of the turbine impeller. Accordingly, the passage width of the throat passage can be smoothly changed along the circumferential direction of the turbine impeller, and it is thus possible to prevent a sharp change in the flow rate of the fluid flowing into the turbine impeller in the circumferential direction.

Further, in the variable geometry turbine according to one aspect of the present disclosure, the width changing mechanism includes a cylindrical member having a cylindrical shape that extends in the axis line direction and including a change section in which one end of the cylindrical shape is inserted into the throat passage in the axis line direction and in which an edge position formed on the one end changes along a circumferential direction of the cylindrical shape, and a drive unit configured to move the cylindrical member in the axis line direction, and the change section is the width change portion.

According to the variable geometry turbine of the aspect, the width changing mechanism includes a cylindrical member having a cylindrical shape that extends in the axis line direction and including a change section in which one end of the cylindrical shape is inserted into the throat passage in the axis line direction and in which an edge position formed on the one end changes along a circumferential direction of the cylindrical shape, and a drive unit configured to move the cylindrical member in the axis line direction, and the change section is the width change portion. Accordingly, the cylindrical member having a change section is inserted into the throat passage by the drive unit, and it is thus possible to reduce the flow channel area for the overall throat passage. Also, the passage width of the throat passage can be changed along the circumferential direction of the turbine impeller by the change section.

Further, a supercharger according to one aspect of the present disclosure includes the variable geometry turbine described above, and a compressor including a compressor impeller rotated by the turbine impeller.

A supercharger according to the aspect includes the variable geometry turbine described above, and a compressor including a compressor impeller rotated by the turbine impeller.

Advantageous Effects of Invention

According to a variable geometry turbine and a supercharger having the same of the present disclosure, it is possible to change flow rate characteristics of a turbine in accordance with engine output with a simple structure, and it is possible to adjust the flow angle of a fluid flowing into a turbine impeller to any angle in the circumferential direction of the turbine impeller.

DESCRIPTION OF EMBODIMENTS

A variable geometry turbine and a supercharger according to one embodiment of the present disclosure will be described below with reference to the drawings.

First, a configuration of a variable geometry turbine 10 and a supercharger will be described.

Figure 1:
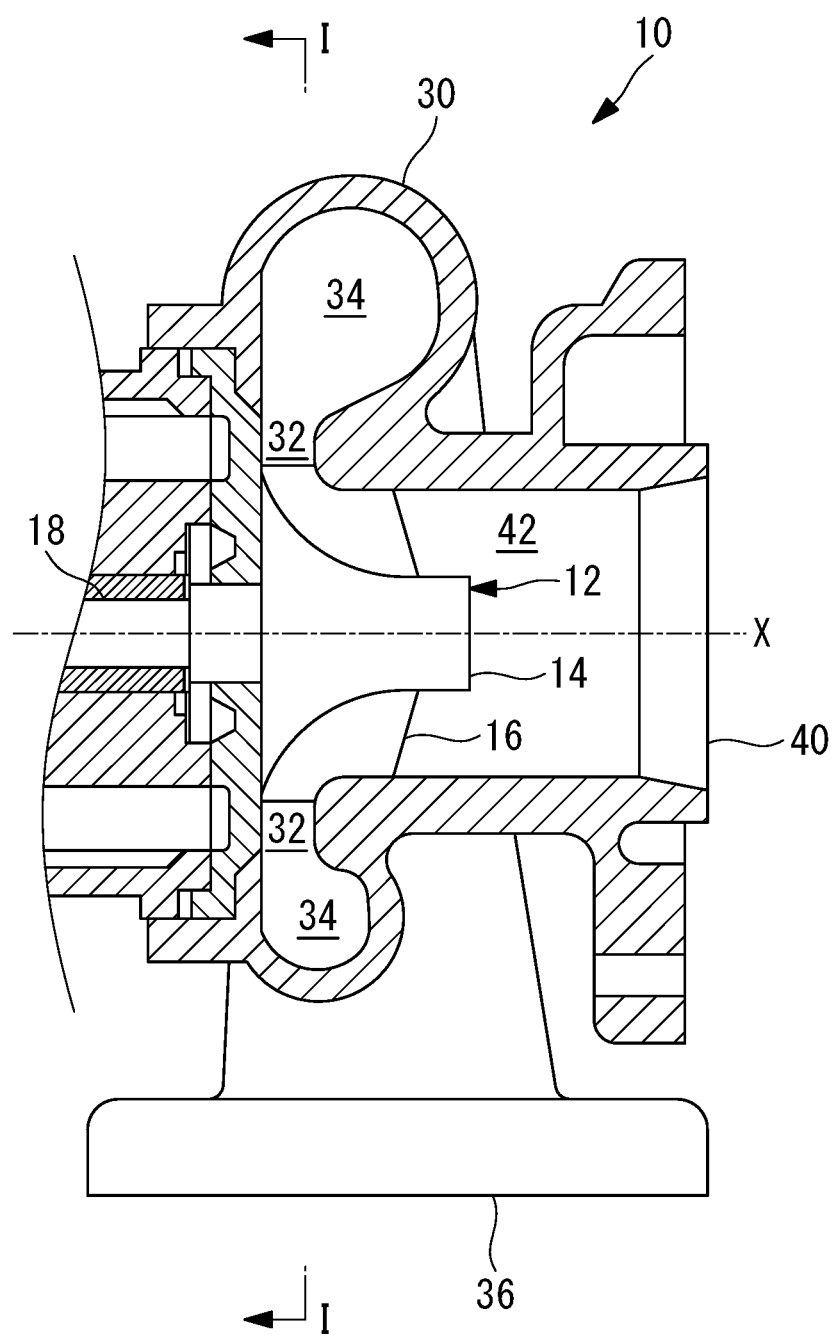
FIG. 1 is a vertical sectional view of a variable geometry turbine according to one embodiment of the present disclosure.

As illustrated in FIG. 1, the variable geometry turbine 10 has a turbine impeller 12 and a turbine housing 30 that accommodates the turbine impeller 12.

The turbine impeller 12 has a hub 14 on which a plurality of blades 16 are formed and is attached to one end (right end in FIG. 1) of a rotor shaft 18.

The rotor shaft 18 is supported by a bearing (not illustrated) to be rotatable about an axis line X. This enables the turbine impeller 12 to rotate about the axis line X.

A compressor impeller (not illustrated) is attached to the other end (left end side in FIG. 1) of the rotor shaft 18. Accordingly, the turbine impeller 12 and the compressor impeller are connected to each other via the rotor shaft 18, and the compressor impeller is rotated by rotation of the turbine impeller 12.

The compressor impeller forms a compressor (not illustrated) that compresses air taken in from outside, and the variable geometry turbine 10 and the compressor (not illustrated) form the supercharger.

Figure 2:
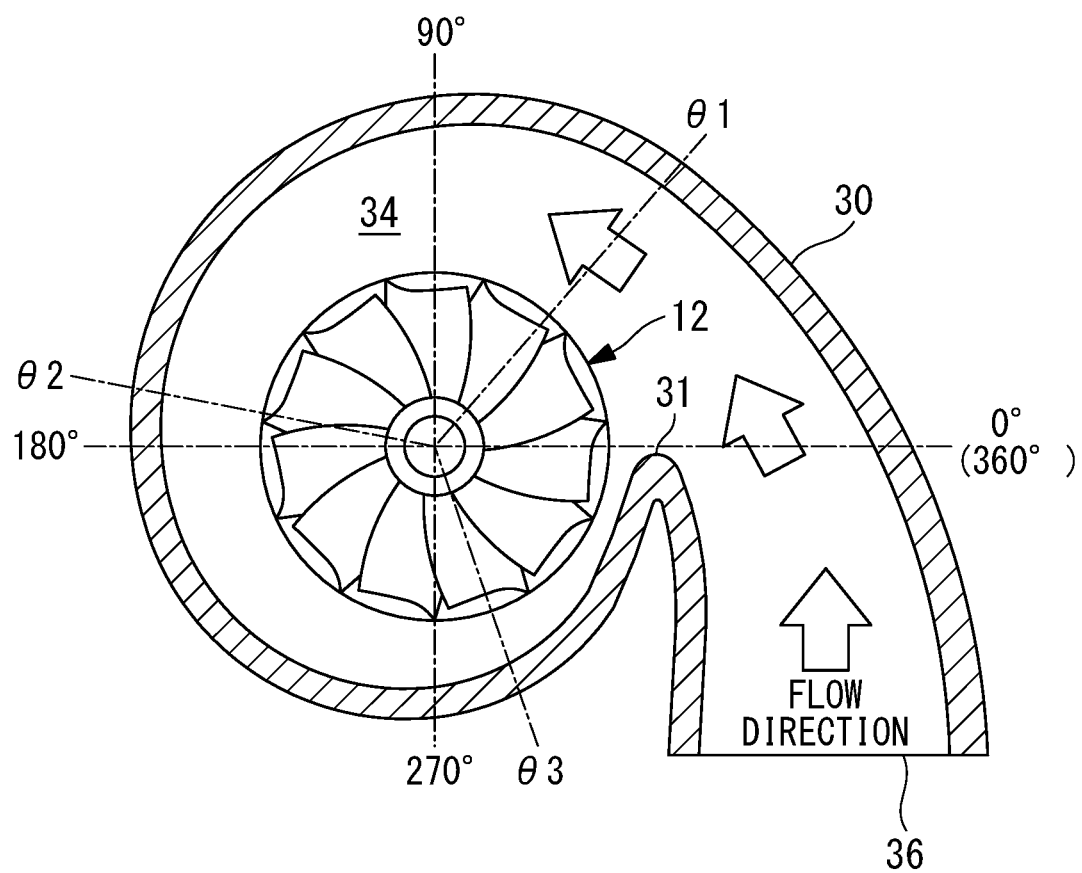
FIG. 2 is a sectional view taken along a cutting line I-I illustrated in FIG. 1.

As illustrated in FIG. 1 and FIG. 2, the turbine housing 30 is a casing that accommodates the turbine impeller 12 and is configured to form a throat passage 32 and a scroll flow channel 34 on the outer circumferential side of the turbine impeller 12.

As illustrated in FIG. 2, the scroll flow channel 34 is a spiral flow channel that extends in the circumferential direction of the turbine impeller 12 with the flow channel area gradually decreasing from an exhaust gas inlet 36 side of the turbine housing 30. In this state, in the scroll flow channel 34, the exhaust gas inlet 36 side is the start of winding, and the exhaust gas flowing direction side is the end of winding. Consequently, the flow channel area of the scroll flow channel 34 gradually decreases from the start of winding to the end of winding.

In FIG. 2, the angle near a tongue portion 31 is defined as 0 degree for the purpose of illustration, the angle increases along an exhaust gas flowing direction, and the angle of the end of winding of the scroll flow channel 34 is defined as 360 degrees.

As illustrated in FIG. 1 and FIG. 2, the throat passage 32 is a flow channel that is formed in the circumferential direction on the outer circumferential side of the turbine impeller 12 and communicates with the scroll flow channel 34. The passage width of the throat passage 32 formed of the turbine housing 30 is constant along the circumferential direction of the turbine impeller 12.

Through the throat passage 32, the space of the turbine housing 30, which accommodates the turbine impeller 12, and the scroll flow channel 34 communicate with each other.

Next, the operation of the variable geometry turbine 10 and the supercharger will be described.

An exhaust gas discharged from an engine (not illustrated) flows into the scroll flow channel 34 from the exhaust gas inlet 36 of the turbine housing 30.

The exhaust gas flowing in the scroll flow channel 34 flows through the scroll flow channel 34 and flows into the turbine impeller 12 via the throat passage 32.

At this time, the flow rate of the exhaust gas flowing into the turbine impeller 12 from the scroll flow channel 34 depends on the flow channel area of the scroll flow channel 34 and the passage width of the throat passage 32.

The exhaust gas that has flown into the turbine impeller 12 passes between the plurality of blades 16 of the turbine impeller 12 and expands to rotate the turbine impeller 12 about the axis line X.

The exhaust gas that has passed through the turbine impeller 12 flows through an outlet flow channel 42 formed inside the turbine housing 30 and is discharged from an exhaust gas outlet 40 to the outside of the variable geometry turbine 10.

On the other hand, the compressor impeller of the compressor (not illustrated) is rotated about the axis line X in response to the rotation of the turbine impeller 12.

The compressor compresses air by the rotation of the compressor impeller. The compressed air is then supplied to the engine (not illustrated).

Next, a width changing mechanism 50 provided in the variable geometry turbine 10 will be described.

Figure 3:
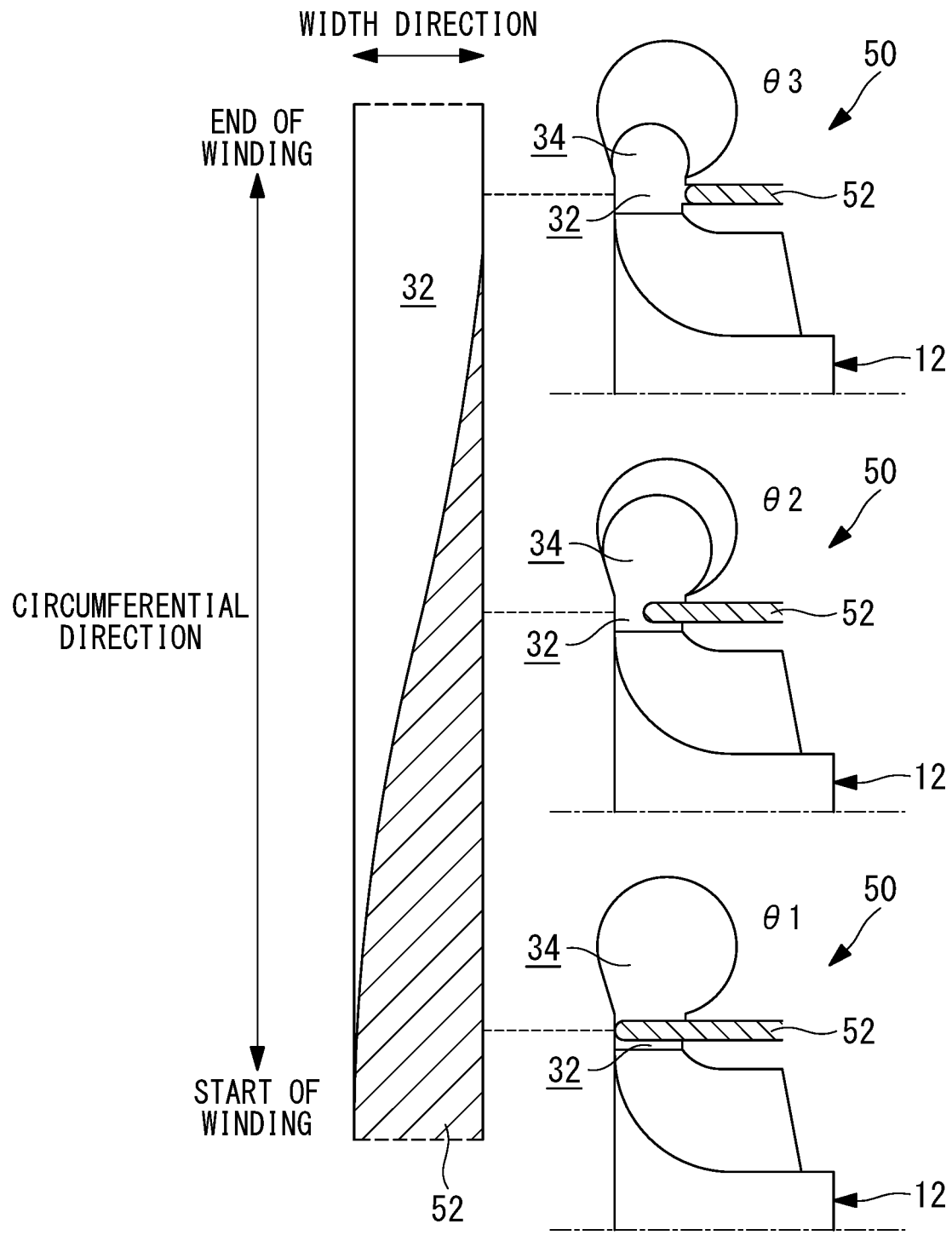
FIG. 3 is a diagram illustrating change of a passage width by a width change portion in a throat passage developed in the circumferential direction.
Figure 4:
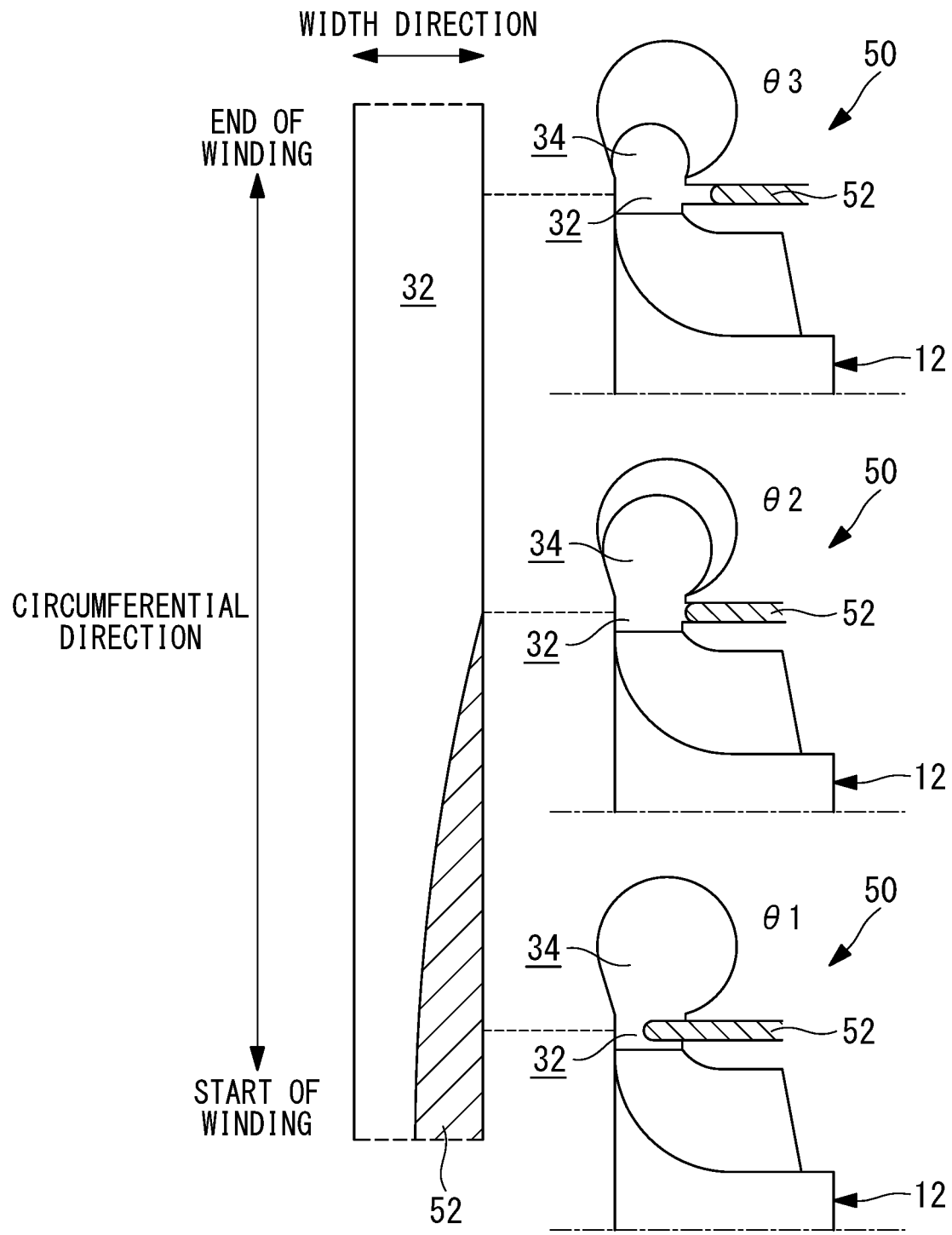
FIG. 4 is a diagram illustrating change of a passage width by a width change portion in a throat passage developed in the circumferential direction.
Figure 5:
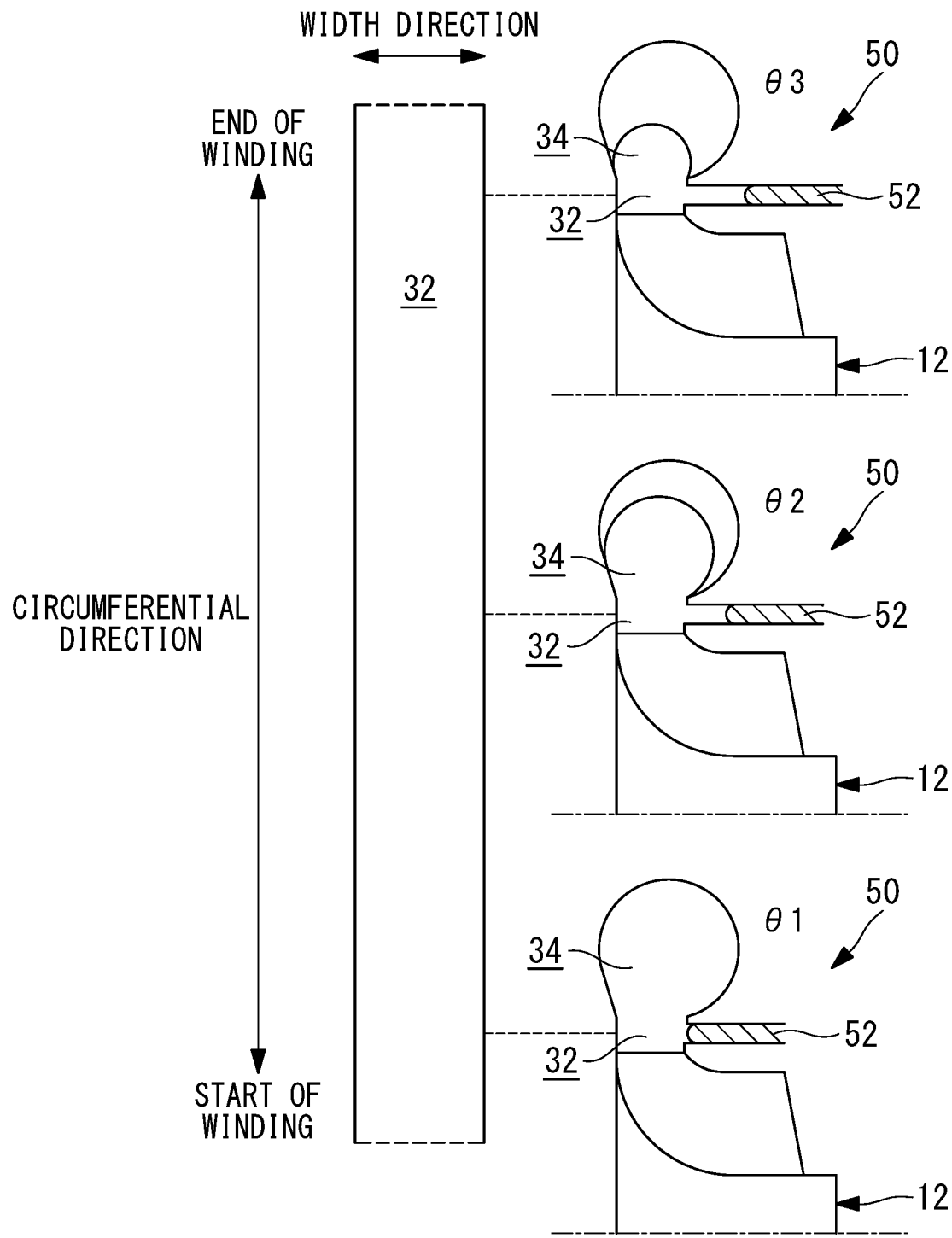
FIG. 5 is a diagram illustrating a state where a throat passage developed in a circumferential direction is fully opened by the width change portion.

As illustrated in FIG. 3 to FIG. 5, the width changing mechanism 50 is a mechanism that is provided to the variable geometry turbine 10 and can move, in the width direction, a width change portion 52 that continuously changes the passage width of the throat passage 32 along the circumferential direction of the turbine impeller 12.

Note that the term "continuously" as used herein means a smoothly connected line shape such as a curved line, which is different from a shape with a sharp change such as a large step.

With this width change portion 52, the exhaust gas flow rate flowing into the turbine impeller 12 from the scroll flow channel 34 can be changed along the circumferential direction of the turbine impeller 12.

For example, in FIG. 3, the passage width of the throat passage 32 is gradually expanded by the width change portion 52 from the start of winding to the end of winding of the scroll flow channel 34. This can reduce the exhaust gas flow rate flowing into the turbine impeller 12 more on the side of the start of winding of the scroll flow channel 34, compared to a case where the passage width is constant along the circumferential direction of the turbine impeller 12.

Note that θ1 to θ3 illustrated in FIG. 3 correspond to θ1 to θ3 illustrated in FIG. 2 that are winding angles of the scroll flow channel 34, which meet θ1<θ2<θ3. Note that the flow channel areas illustrated in FIG. 2 and FIG. 3 are not accurately depicted and θ1 to θ3 illustrated in FIGS. 2 and θ1 to θ3 illustrated in FIG. 3 do not strictly correspond to each other.

Herein, the change in the passage width provided by the width change portion 52 is not limited to those illustrated in FIG. 2 and FIG. 3 and can be changed in any manner. Specifically, the shape of the width change portion 52 is changed in any manner, and it is thus possible to change an exhaust gas flow rate flowing into the turbine impeller 12 from the scroll flow channel 34 in any manner along the circumferential direction of the turbine impeller 12.

As illustrated in FIG. 3 to FIG. 5, the width change portion 52 described above is movable along the width direction. This enables adjustment of the flow channel area for the overall throat passage 32 along the circumferential direction of the turbine impeller 12.

For example, as illustrated in FIG. 5, a part of the throat passage 32 is closed from the throat passage 32 in which a passage is fully opened along the circumferential direction of the turbine impeller 12 (that is, the passage width is constant along the whole circumferential direction of the turbine impeller 12) as illustrated in FIG. 3 and FIG. 4 (indicated by a shaded portion therein). Thus, it is possible to change the flow channel area for the overall throat passage 32. This enables adjustment of the exhaust gas flow rate flowing into the turbine impeller 12 from the overall scroll flow channel 34 in accordance with engine output.

Specifically, when the engine is operated with high output, the throat passage 32 is fully opened as illustrated in FIG. 5, and it is thus possible to take in the exhaust gas from the engine to the variable geometry turbine 10 with no waste. In contrast, since the exhaust gas flow rate is small when the engine is operated with low output, a part of the throat passage 32 is closed as illustrated in FIG. 3 and FIG. 4, and it is thus possible to increase the flow velocity of the exhaust gas flowing into the turbine impeller 12 to efficiently rotate the turbine impeller 12.

Figure 6:
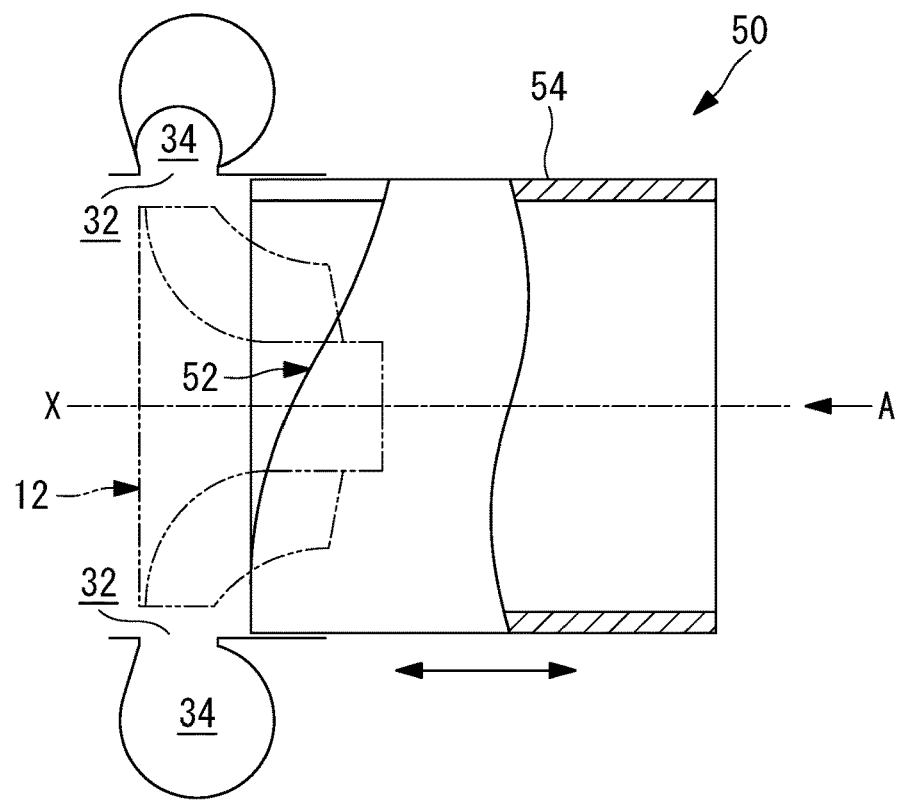
FIG. 6 is a diagram illustrating a configuration of a cylindrical member.
Figure 7:
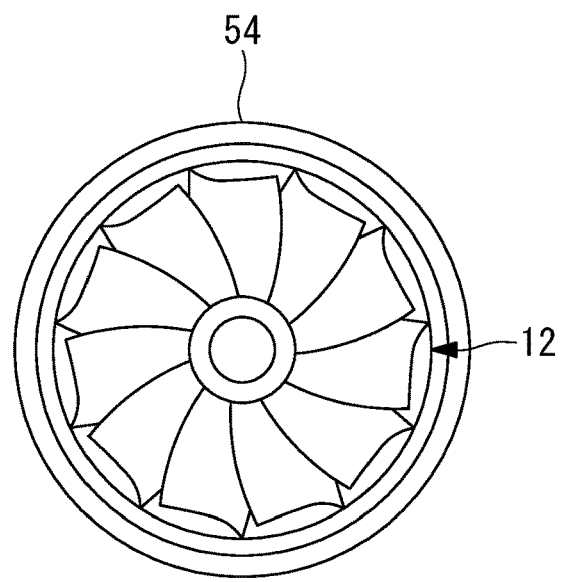
FIG. 7 is a diagram viewed from an arrow A illustrated in FIG. 6.

As illustrated in FIG. 6 and FIG. 7, such a width changing mechanism 50 has a cylindrical member 54 and a drive unit that moves the cylindrical member 54 in the axis line X direction.

The cylindrical member 54 is a cylindrical shape surrounding the turbine impeller 12 from the outer circumferential side, and one end side (left end side in FIG. 5) of the cylindrical shape can be inserted into the throat passage 32 along the axis line X direction.

The cylindrical member 54 has a section (a change section 52) in which an edge position on an insertion end side (one end side described above) continuously changes in the axis line X direction along the circumferential direction of the cylindrical shape.

The change section 52 corresponds to the width change portion 52 described above, and the edge shape (change degree of the edge position) of the change section 52 can be determined to be any shape, taking into consideration a target passage width of the throat passage 32.

Figure 8:
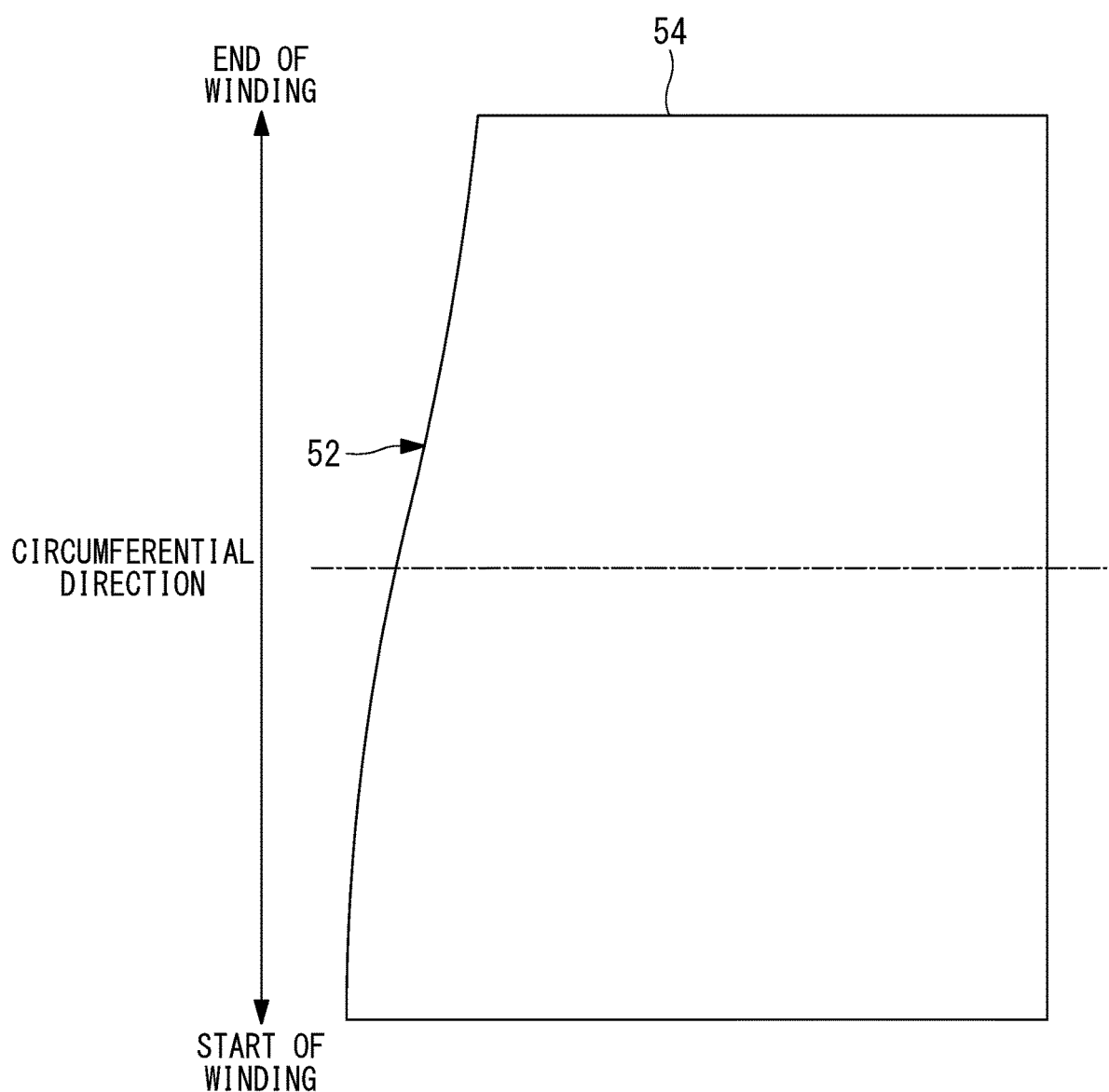
FIG. 8 is a developed view of the cylindrical member.

FIG. 8 illustrates a developed view of the cylindrical member 54. To make the width change portion 52 as illustrated, for example, in FIG. 3, it may be configured in such a way that the edge shape of the change section 52 of the cylindrical member 54 illustrated in FIG. 8 corresponds to the shape of the width change portion 52 illustrated in FIG. 3.

As illustrated in FIG. 6, the cylindrical member 54 is movable in the axis line X direction by the drive unit (not illustrated). This enables adjustment of the insertion quantity of the change section 52 with respect to the throat passage 32. Thus, as illustrated in FIG. 3 to FIG. 5, it is possible to fully open the throat passage 32 or partially close the throat passage 32.

The advantageous effects described below are achieved in the present embodiment.

The passage width of the throat passage 32 is changed by the width changing mechanism 50 (that is, the flow channel area of the throat passage 32 is adjusted), and it is thus possible to adjust the flow rate of an exhaust gas flowing into the turbine impeller 12 from the scroll flow channel 34. This can change the flow rate characteristics in accordance with engine output with a simple structure without using a complex structure such as VG turbines. Thus, compared to the VG turbine, the number of components can be reduced by the simplified structure, and accordingly, the failure rate can be reduced and the reliability can be improved.

Further, the passage width of the throat passage 32 is changed by the width change portion 52 along the circumferential direction of the turbine impeller 12, and it is thus possible to adjust the flow angle of the exhaust gas flowing into the turbine impeller 12 to any angle in the circumferential direction of the turbine impeller 12.

The flow angle is larger, for example, near the start of winding of the scroll flow channel 34 because of large fluid inflow in the turbine impeller 12. In contrast, the flow angle is small near the end of winding, because the flow velocity is reduced due to a friction loss subjected from an inner wall face of the turbine housing 30 forming the scroll flow channel 34. Consequently, unevenness may occur in flow angles in the circumferential direction of the turbine impeller 12, which may cause performance deterioration of the variable geometry turbine 10. However, the passage width of the throat passage 32 is changed to gradually expand from the start of winding to the end of winding of the scroll flow channel 34, and it is thus possible to avoid excessive fluid inflow to the turbine impeller 12 near the start of winding and avoid a reduction in the flow velocity of the fluid near the end of winding by ensuring the flow rate of the exhaust gas. Accordingly, it is possible to avoid unevenness of flow angles in the circumferential direction of the turbine impeller 12 to obtain an even distribution of flow angles in the circumferential direction of the turbine impeller 12, thereby improving the performance of the variable geometry turbine 10.

Further, the width change portion 52 continuously changes the passage width of the throat passage 32 along the circumferential direction of the turbine impeller 12. Accordingly, the passage width of the throat passage 32 can be smoothly changed along the circumferential direction of the turbine impeller 12, and it is thus possible to prevent a sharp change in the flow rate of the fluid flowing into the turbine impeller 12 in the circumferential direction.

Note that, as described above, the flow rate of the exhaust gas flowing into the turbine impeller 12 from the scroll flow channel 34 depends on the flow channel area of the scroll flow channel 34 and the passage width of the throat passage 32. Accordingly, taking into consideration the change of the flow channel area along the winding direction of the scroll flow channel 34, the shape of the change section 52 (width change portion 52) is determined to achieve an optimal distribution of flow angles.

REFERENCE SIGNS LIST 10 variable geometry turbine
12 turbine impeller
14 hub
16 blade
18 rotor shaft
30 turbine housing
31 tongue portion
32 throat passage
34 scroll flow channel
36 exhaust gas inlet
40 exhaust gas outlet
42 outlet flow channel
50 width changing mechanism
52 width change portion (change section)
54 cylindrical member
X axis line

The invention claimed is:

1. A variable geometry turbine comprising:
a turbine impeller configured to rotate about an axis line;
a turbine housing configured to accommodate the turbine impeller and forming a throat passage and a scroll flow channel on an outer circumferential side of the turbine impeller, the scroll flow channel communicating with the throat passage; and
a width change portion inserted into the throat passage so as to partially close the throat passage,
wherein the width change portion is configured to move in an axis line direction and partially closes the throat passage such that a width of the throat passage continuously and gradually changes over a whole circumstance of the turbine.

2. The variable geometry turbine according to claim 1, wherein the width change portion continuously and gradually changes the width of the throat passage from a start of winding to an end of winding of the scroll flow channel.

3. The variable geometry turbine according to claim 1, further comprising:
a cylindrical member configured to move in the axis line direction,
wherein the cylindrical member has a cylindrical shape that extends in the axis line direction and includes a change section in which one end of the cylindrical shape is inserted into the throat passage in the axis line direction and in which an edge position formed on the one end continuously and gradually changes over a whole circumstance of the cylindrical shape,
wherein the change section is the width change portion.

4. The variable geometry turbine according to claim 3, wherein the change section continuously and gradually changes the width of the throat passage from a start of winding to an end of winding of the scroll flow channel.

* * * * *